United States Patent Office  
3,692,691  
Patented Sept. 19, 1972

3,692,691  
PREPARATION OF DIHYDROCARBYL 2- OR 4-HYDROXYBENZYL $C_{4-20}$ ALKYL ETHERS  
Bernard R. Meltsner, Royal Oak, Mich., assignor to Ethyl Corporation, New York, N.Y.  
No Drawing. Filed May 17, 1971, Ser. No. 144,284  
Int. Cl. C07c 41/10, 43/20  
U.S. Cl. 252—404          10 Claims

ABSTRACT OF THE DISCLOSURE

Dihydrocarbyl 2- or 4-hydroxybenzyl $C_{4-20}$ alkyl ethers are prepared by reacting a dihydrocarbyl 2- or 4-hydroxybenzyl methyl ether with a higher primary alkanol in the presence of an acid catalyst under conditions such that methanol is distilled out. The dihydrocarbyl hydroxybenzyl methyl ether may be formed by reacting a dihydrocarbyl 2- or 4-hydroxybenzyl halide with a mixture of methanol and higher primary alkanols such that the methyl ether forms first and undergoes transetherification with the higher alkanol. The products are useful antioxidants.

BACKGROUND

Dihydrocarbyl hydroxybenzyl alkyl ethers are useful antioxidants. They are reported to be made by reaction of dihydrocarbylphenols with formaldehyde and a monohydric alkanol (Filbey, U.S. 2,838,571). In the case of the methyl ether, they can also be formed by reacting a dihydrocarbyl hydroxybenzyl hailde with methanol.

SUMMARY OF THE INVENTION

When the reaction of a dihydrocarbyl hydroxybenzyl chloride is carried out with a higher alkanol, for example, those containing from 4–20 carbon atoms, a substantial amount of methylenebis(dihydrocarbylphenol) forms as a co-product. An object of the present invention is to provide a process for making a dihydrocarbyl 2- or 4-hydroxybenzyl higher alkyl ether without the formation of an excessive amount of methylenebisphenolic contaminant. This and other objects are accomplished by providing a process in which a dihydrocarbyl 2- or 4-hydroxybenzyl methyl ether is reacted with a $C_{4-20}$ primary alkanol in the presence of an acid catalyst under conditions such that etherification occurs and methanol is distilled from the mixture.

DESCRIPTION OF THE PREFERRED EMBODIMENT

A preferred embodiment of the invention is a process for making a dihydrocarbyl 2- or 4-hydroxybenzyl $C_{4-20}$ alkyl ether, said process comprising reacting a dihydrocarbyl 2- or 4-hydroxybenzyl methyl ether with a $C_{4-20}$ primary alkanol in the presence of an acid catalyst under conditions such that methanol is distilled out.

The dihydrocarbyl hydroxybenzyl methyl ethers employed in the process are compounds having the formula:

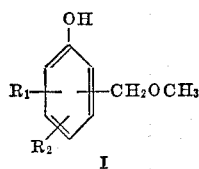

I in which $R_1$ and $R_2$ are hydrocarbon groups, preferably $C_{1-20}$ alkyl, $C_{7-20}$ aralkyl, $C_{6-12}$ cycloalkyl, and $C_{6-20}$ aryl. In Formula I the methoxymethyl group is located ortho or para to the hydroxyl group. Representative examples of these ethers are:

3,5-dimethyl-4-hydroxybenzyl methyl ether  
3,5-diethyl-4-hydroxybenzyl methyl ether  
3-methyl-5-isopropyl-4-hydroxybenzyl methyl ether  
3,5-di-sec-butyl-4-hydroxybenzyl methyl ether  
3-methyl-5-tert-butyl-4-hydroxybenzyl methyl ether  
2-methyl-5-tert-butyl-4-hydroxybenzyl methyl ether  
2,5-di-tert-butyl-4-hydroxybenzyl methyl ether  
3-methyl-5-sec-octyl-4-hydroxybenzyl methyl ether  
3-methyl-5-tert-dodecyl-4-hydroxybenzyl methyl ether  
2-methyl-5-sec-eicosyl-4-hydroxybenzyl methyl ether  
3,5-dicyclohexyl-4-hydroxybenzyl methyl ether  
3-methyl-5-cyclooctyl-4-hydroxybenzyl methyl ether  
3-tert-butyl-5-(4-tert-butyl-cyclohexyl)-4-hydroxybenzyl methyl ether  
3,5-di-tert-butyl-2-hydroxybenzyl methyl ether  
3-methyl-5-cyclohexyl-2-hydroxybenzyl methyl ether  
3-tert-butyl-5-(2,4-diisopropylcyclohexyl)-2-hydroxybenzyl methyl ether  
3-tert-butyl-5-methyl-2-hydroxybenzyl methyl ether  
3-tert-butyl-6-methyl-2-hydroxybenzyl methyl ether  
3-tert-octyl-5-methyl-2-hydroxybenzyl methyl ether  
3-methyl-5-sec-eicosyl-2-hydroxybenzyl methyl ether  
3,5-di($\alpha$-methylbenzyl)-2-hydroxybenzyl methyl ether  
3,5-di($\alpha$-methylbenzyl)-4-hydroxybenzyl methyl ether  
3-methyl-5-($\alpha,\alpha$-dimethylbenzyl)-4-hydroxybenzyl methyl ether  
3-methyl-5-($\alpha$-methyl-$\alpha$-ethylbenzyl)-4-hydroxybenzyl methyl ether  
3,5-dibenzyl-4-hydroxybenzyl methyl ether  
3-tert-butyl-5-($\alpha,\alpha$-dimethyl-4-sec-decylbenzyl)-2-hydroxybenzyl methyl ether  
3-isopropyl-5-($\alpha$-methyl-4-dodecylbenzyl)-4-hydroxybenzyl methyl ether  
3,5-diphenyl-4-hydroxybenzyl methyl ether  
3-methyl-5-($\alpha$-naphthyl)-4-hydroxybenzyl methyl ether  
3,5-di(2,4-di-sec-heptylphenyl)-2-hydroxybenzyl methyl ether The preferred compound is 3,5-dialkyl-4-hydroxybenzyl methyl ether. The most preferred compound is 3,5-di-tert-butyl-4-hydroxybenzyl ether.

The higher alkanols which undergo the transetherification reaction can be any alkanol higher than methyl. Preferably they are primary alkanols containing from about 4–20 carbon atoms. Examples of these are: n-butanol, isobutanol, n-pentanol, isopentanol, n-hexanol, 2-methylbutanol, 2-ethylbutanol, n-heptanol, isohexanol, 2-ethylhexanol, n-octanol, n-decanol, 2-ethyloctanol, n-dodecanol, 2-ethyldodecanol, 2-methyldodecanol, n-eicosanol, and the like.

The preferred higher alkanols are mixtures consisting mainly of primary decanols and dodecanols because such alcohol mixtures lead to liquid products. The preferred alkanol mixture can contain minor amounts of lower and higher alkanols such as octanol or tetradecanol. It can be defined as a mixture of primary alkanols consisting essentially of 0–5 weight percent octanols, 40–85 weight percent decanols, 10–50 weight percent dodecanols, and 0–5 weight percent tetradecanols. Most of the alkanols in the mixture are normal or straight chain, but minor amounts, up to about 25 percent, can have a branched chain primary alkanol structure. Examples of these alcohol mixtures are shown in the following table.

|  | Alcohol mixtures (weight percent) | | | | |
| --- | --- | --- | --- | --- | --- |
|  | A | B | C | D | E |
| n-Octanol | 1.0 | 2.0 | 2.0 | 3.0 | 0.5 |
| Isooctanol | 0.3 | 0.5 | 0.5 | 2.0 | 0.0 |
| n-Decanol | 68.0 | 39.0 | 80.0 | 73.0 | 63.0 |
| Isodecanol | 2.0 | 1.0 | 5.0 | 3.0 | 2.0 |
| n-Dodecanol | 10.0 | 40.0 | 5.0 | 10.0 | 30.0 |
| Isododecanol | 15.0 | 10.0 | 5.0 | 5.0 | 2.0 |
| n-Tetradecanol | 0.5 | 2.0 | 2.0 | 2.0 | 2.0 |
| Isotetradecanol | 2.0 | 3.0 | 0.5 | 1.0 | 0.5 |
| n-Cetyl | 0.4 | 1.5 | 0.0 | 0.5 | 0.0 |
| Isocetanol | 0.8 | 1.0 | 0.0 | 0.5 | 0.0 |

"Iso" alcohols are branched chain primary alcohols. From the above, it can be seen that the principal components of the preferred alkanol mixture are decanols and dodecanols with only minor amounts of lower and higher alkanols.

The amount of higher alkanol reacted with the methyl ether should be enough to provide at least a mole of the higher alkanol per mole of the dihydrocarbyl hydroxybenzyl methyl ether. A useful range is from about 1–10 moles of $C_{4-20}$ alkanol per mole of dihydrocarbyl hydroxybenzyl methyl ether.

The transetherification is catalyzed by acids. The strong organic and inorganic acids are preferred, such as trifluoro acetic, trichloro acetic, sulfuric, sulfurous, phosphoric, hydrochloric, aromatic sulfonic acids such as p-toluene sulfonic acids, sulfonated ion exchange resins such as sulfonated polystyrene beads, and sulfonated aliphatics such as methane-sulfonic acid. The amount of catalyst is not critical as long as enough is present to catalyze the transetherification. In other words, only a catalytic amount is required. A useful range is from about 0.05–5 weight percent. A preferred range is from about 0.1–1 weight percent, based on the weight of the reaction mixture.

Although a solvent is not required, one can be employed. Useful solvents are the aliphatic and aromatic hydrocarbons such as hexane, heptane, octane, nonane, benzene, toluene, xylene, and the like.

The process is carried out under conditions such that the methanol formed during the reaction is distilled out. This is accomplished by heating the mixture to a temperature above the boiling point of methanol (64.7° C.) and providing an outlet to permit the methanol vapor to escape. The reaction mixture temperature to accomplish this will generally be from about 75–175° C. If the vapor temperature increases substantially above this the temperature of the reaction mixture should be lower. Generally the methanol vapor is condensed and collected. Such means of removing a volatile reaction product by distillation are well known from such processes as transesterification processes, in which a higher alkanol replaces a lower alkanol in an ester and the lower alkanol is distilled out as it forms.

The following examples will serve to illustrate the manner in which the process is conducted. All parts are by weight unless otherwise indicated.

EXAMPLE 1

In a reaction vessel fitted with a stirrer, heating means and a distillation column was placed 25 parts of 3,5-di-tert-butyl-4-hydroxybenzyl methyl ether, 35 parts of a mixture of 43 weight percent n-decanol and 57 weight percent n-dodecanol, 40 parts of xylene, and 0.1 part of p-toluene sulfonic acid. The mixture was stirred and heated to about 157° C. over a 1.5 hour period while distilling out 3.2 parts of methanol (65–70° C. vapor temperature). The mixture was then cooled, washed with dilute aqueous sodium bicarbonate, and then with water. Xylene and excess $C_{10-12}$ alcohol was distilled out under vacuum (0.3 mm. Hg), up to a liquid temperature of 140° C. The product was 41 parts of 3,5-di-tert-butyl-4-hydroxybenzyl $C_{10-12}$ alkyl ether, which was liquid at room temperature.

Any of the other dihydrocarbyl hydroxybenzyl methyl ethers disclosed above can be used in the above example with good results. Likewise, other higher alkanols can be substituted for the decanol-dodecanol mixture used in the example.

Furthermore, other acid catalysts such as sulfuric, phosphoric, trifluoro acetic, and the like, can be substituted for the p-toluene sulfonic acid.

An especially useful embodiment of the invention is the modification of the process in which the methyl ether is first formed and then transetherized in the same reaction. The methyl ether forms very readily by reaction of a hydroxybenzyl halide with methanol. Thus, in a mixture of alkanols containing methanol and higher primary alkanols a hydroxybenzyl halide will react first with the methanol. This then reacts with the higher primary alkanol, forming higher alkyl ethers. The process can be carried out in one reaction by simply mixing the appropriate dihydrocarbyl 2- or 4-hydroxybenzyl halide with methanol and a $C_{4-20}$ primary alkanol and heating the mixture causing methanol to distill out. Additional acid catalyst can be added to obtain a faster reaction rate, but the hydrogen halide formed by the reaction of the hydroxybenzyl halide with methanol is usually sufficient.

The amount of methanol used in this embodiment should be enough to form an amount of hydroxybenzyl methyl ether sufficient to promote the reaction. It need not be an amount equal on a mole basis to the hydroxybenzyl halide because once some hydroxybenzyl methyl ether forms it can react with the higher alkanol forming a hydroxybenzyl higher alkyl ether and regenerating methanol. Thus, amounts of methanol from about 0.1–10 moles per mole of dihydrocarbyl hydroxybenzyl halide are useful. It is preferred that the methanol present be sufficient to convert all the dihydrocarbyl hydroxybenzyl halide to the methyl ether, so a more preferred amount of methanol is from about 1–10 moles per mole of dihydrocarbyl hydroxybenzyl halide.

The preferred hydroxybenzyl halides are the dihydrocarbyl 2- or 4-hydroxybenzyl chlorides such as shown in U.S. 3,257,321. These can be represented by the following formula in which $R_1$ and $R_2$ are the same as in Formula I, X is halogen and the halomethyl group is ortho or para to the hydroxyl.

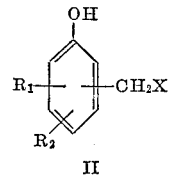

II

The more preferred reactants are the 3,5-dialkyl-4-hydroxybenzyl chlorides, especially 3,5-di-tert-butyl-4-hydroxybenzyl chloride.

The amount of higher primary alkanol is the same as in the previous embodiment; that is, the preferred amount is from about 1–10 moles per mole of dihydrocarbyl 2- or 4-hydroxybenzyl halide.

The mixture of dihydrocarbyl hydroxybenzyl halide, methanol and higher primary alkanol and, optionally, additional acid catalyst is stirred and heated such that methanol is distilled out in the same manner as in the previous embodiment. This method of carrying out the process is illustrated by the following example.

EXAMPLE 2

In a reaction vessel fitted with a stirrer, heating means and a distillation column was placed 114 parts of a xylene solution containing 55.8 weight percent of 3,5-di-tert-butyl-4-hydroxybenzyl chloride. Following this, 45 parts of xylene, 20 parts of methanol, 83 parts of an alcohol mixture consisting essentially of 43 weight percent n-decanol and 57 weight percent n-dodecanol, and 0.2 part of p-toluene sulfonic acid were added. The mixture was stirred and heated gradually to about 130° C. Over a 2- hour period, methanol was distilled out at a vapor temperature of about 65° C. The reaction mixture was then cooled and washed with aqueous sodium bicarbonate and water. The xylene solvent and other volatiles were distilled out under vacuum (about 15 mm. Hg) up to a liquid temperature of 145° C. The product was filtered, giving a liquid product at room temperature which did not form any crystal deposits during three months of observation.

Other dihydrocarbyl hydroxybenzyl halides can be substituted in place of the 3,5-di-tert-butyl-4-hydroxybenzyl chloride in the above example. Representative examples of these are:

3,5-dimethyl-4-hydroxybenzyl bromide
3,5-diethyl-4-hydroxybenzyl chloride
3-methyl-5-isopropyl-4-hydroxybenzyl iodide
3,5-di-sec-butyl-4-hydroxybenzyl chloride
3-methyl-5-tert-butyl-4-hydroxybenzyl bromide
2-methyl-5-tert-butyl-4-hydroxybenzyl chloride
2,5-di-tert-butyl-4-hydroxybenzyl bromide
3-methyl-5-sec-octyl-4-hydroxybenzyl chloride
3-methyl-5-sec-dodecyl-4-hydroxybenzyl bromide
2-methyl-5-sec-eicosyl-4-hydroxybenzyl chloride
3,5-dicyclohexyl-4-hydroxybenzyl iodide
3-methyl-5-cyclooctyl-4-hydroxybenzyl chloride
3-tert-butyl-5-(2,4-di-n-propylcyclohexyl)-2-hydroxybenzyl chloride
3-methyl-5-tert-butyl-2-hydroxybenzyl chloride
3,5-di($\alpha$-methylbenzyl)-2-hydroxybenzyl bromide
3,5-diphenyl-4-hydroxybenzyl iodide
3-methyl-5-$\beta$-naphthyl-4-hydroxybenzyl bromide
3-tert-butyl-5-($\alpha,\alpha$-dimethyl-4-sec-decylbenzyl)-2-hydroxy-benzyl chloride.

From the foregoing, it is apparent that the hydroxybenzyl halides correspond in structure to the previously described hydroxybenzyl methyl ethers except that the halide group replaces the methoxide group.

Likewise, other higher primary alcohols or mixtures of higher alcohols can be used in place of the decanol-dodecanol mixture used in Example 2.

The additives made by the process of this invention are excellent antioxidants in a wide range of organic materials as shown in U.S. 2,838,571. The product made using the preferred mixture of decyl and dodecyl alcohol is an especially useful product because it remains liquid at room temperature and is more readily handled in commercial applications. Furthermore, it is much easier to disperse into organic substrates. For example, a stable lubricating oil is formed by adding 0.5 weight percent of the product of Example 2 to a neutral midcontinent mineral oil. Other additives normally used in lubricating oil formulations can be included such as zinc, dialkyldithiophosphates, calcium aryl sulfonates, polylauryl methacrylate VI improvers, and the like.

Likewise, the products can be added to a styrene-butadiene latex in an amount equal to 0.5 part per hundred of SBR. The latex is coagulated by addition to an aqueous sulfuric acid-sodium chloride solution. The SBR crumb which separates is very stable during storage over long periods of time and when formulated and vulcanized results in an excellent rubber.

I claim:

1. A process for making a dihydrocarbyl 2- or 4-hydroxybenzyl $C_{4-20}$ alkyl ether, said process comprising reacting a dihydrocarbyl 2- or 4-hydroxybenzyl methyl ether with a $C_{4-20}$ primary alkanol in the presence of an acid catalyst and distilling off methanol as formed.

2. A process of claim 1 wherein said dihydrocarbyl hydroxybenzyl methyl ether is a 3,5-dialkyl-4-hydroxybenzyl methyl ether.

3. A process of claim 2 wherein said 3,5 - dialkyl-4-hydroxybenzyl methyl ether is 3,5 - di - tert - butyl-4-hydroxybenzyl methyl ether.

4. A process of claim 3 wherein said alkanol is a mixture consisting essentially of primary decanols and primary dodecanols.

5. A process of claim 4 wherein said mixture consists essentially of 0–5 weight percent octanol, 40–85 weight percent decanol, 10–50 weight percent dodecanol, and 0–5 weight percent tetradecanol.

6. A process for making a dihydrocarbyl - 4 - hydroxybenzyl $C_{4-20}$ alkyl ether, said process comprising mixing a dihydrocarbyl 4 - hydroxybenzyl halide, methanol and a $C_{4-20}$ primary alkanol and heating the mixture to distill out methanol.

7. A process of claim 6 wherein said dihydrocarbyl hydroxybenzyl halide is a 3,5-dialkyl - 4 - hydroxybenzyl chloride.

8. A process of claim 7 wherein said 3,5 - dialkyl-4-hydroxybenzyl chloride is 3,5 - di - tert - butyl - 4 - hydroxybenzyl chloride.

9. A process of claim 8 wherein said $C_{4-20}$ primary alkanol is a mixture consisting essentially of primary decanols and primary dodecanols.

10. A process of claim 9 wherein said mixture consists essentially of 0–5 weight percent octanols, 40–85 weight percent decanols, 10–50 weight percent dodecanols, and 0–5 weight percent tetradecanols.

References Cited

UNITED STATES PATENTS

| | | | |
|---|---|---|---|
| 2,838,571 | 6/1958 | Filbey | 260—611 A |
| 2,841,624 | 7/1958 | Norton et al. | 260—611 A |
| 2,954,345 | 9/1960 | Filbey | 260—611 A |
| 3,637,867 | 1/1972 | Clark et al. | 260—611 A |

LEON D. ROSDOL, Primary Examiner

I. GLUCK, Assistant Examiner

U.S. Cl. X.R.

252—407; 260—611 A